United States Patent
Shinoda

(10) Patent No.: US 9,929,586 B2
(45) Date of Patent: Mar. 27, 2018

(54) BATTERY PACK AND PORTABLE ELECTRONIC APPARATUS

(71) Applicant: KYOCERA CORPORATION, Kyoto-shi, Kyoto (JP)

(72) Inventor: Yoshiyuki Shinoda, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 164 days.

(21) Appl. No.: 14/894,497

(22) PCT Filed: May 28, 2014

(86) PCT No.: PCT/JP2014/064192
§ 371 (c)(1),
(2) Date: Nov. 27, 2015

(87) PCT Pub. No.: WO2014/192834
PCT Pub. Date: Dec. 4, 2014

(65) Prior Publication Data
US 2016/0118840 A1    Apr. 28, 2016

(30) Foreign Application Priority Data

May 28, 2013 (JP) .................................. 2013-112397

(51) Int. Cl.
*H02J 7/02* (2016.01)
*H01M 10/46* (2006.01)
(Continued)

(52) U.S. Cl.
CPC ............. *H02J 7/025* (2013.01); *H01M 10/46* (2013.01); *H01M 10/48* (2013.01);
(Continued)

(58) Field of Classification Search
CPC ...................................................... H02J 7/025
(Continued)

(56) References Cited

U.S. PATENT DOCUMENTS

| 2007/0013341 | A1 | 1/2007 | Hitomi et al. |
| 2013/0026983 | A1* | 1/2013 | Yamamoto ............ H02J 7/0055 320/108 |
| 2013/0335019 | A1 | 12/2013 | Katsumata |

FOREIGN PATENT DOCUMENTS

| JP | 2006-81094 A | 3/2006 |
| JP | 2006-339070 A | 12/2006 |

(Continued)

OTHER PUBLICATIONS

International Search Report dated Aug. 12, 2014, corresponding to International Patent Application No. PCT/JP2014/064192.
(Continued)

*Primary Examiner* — Thuan Do
(74) *Attorney, Agent, or Firm* — Hauptman Ham, LLP

(57) ABSTRACT

A battery pack having a power-supply terminal, a ground terminal, and a communication terminal includes: a secondary battery that is connected to the power-supply terminal and the ground terminal; a resistive element that is connected to the communication terminal and the ground terminal; a switch unit that is connected in parallel to the resistive element and that is connected to the communication terminal and the ground terminal; and a controller that performs control of switching an ON state and an OFF state of a switch of the switch unit. The battery pack may further include a non-contact charging unit that performs non-contact charging, the resistive element may be a temperature sensor, and the controller may switch the switch of the switch unit to the ON state when the non-contact charging is started by the non-contact charging unit.

8 Claims, 5 Drawing Sheets

(51) Int. Cl.
*H01M 10/48* (2006.01)
*H02J 7/00* (2006.01)
*H01M 2/10* (2006.01)
*H01M 10/42* (2006.01)

(52) U.S. Cl.
CPC .......... *H02J 7/0021* (2013.01); *H02J 7/0044* (2013.01); *H02J 7/0055* (2013.01); *H01M 2/1022* (2013.01); *H01M 2010/4278* (2013.01); *H01M 2220/30* (2013.01); *H02J 2007/0096* (2013.01)

(58) Field of Classification Search
USPC ....................................................... 320/108
See application file for complete search history.

(56) References Cited

FOREIGN PATENT DOCUMENTS

| | | |
|---|---|---|
| JP | 2007-26712 A | 2/2007 |
| JP | 2007-282472 A | 10/2007 |
| JP | 2009-94037 A | 4/2009 |
| JP | 2009-117262 A | 5/2009 |
| JP | 2009-187720 A | 8/2009 |
| JP | 2010-252505 A | 11/2010 |
| JP | 2013-31301 A | 2/2013 |
| WO | 2012/132276 A1 | 10/2012 |
| WO | 2012/160791 A1 | 11/2012 |
| WO | 2013/015205 A1 | 1/2013 |
| WO | 2013/015207 A1 | 1/2013 |

OTHER PUBLICATIONS

Office Action in JP Application No. 2015-519913 dated Sep. 6, 2016, for which an explanation of relevance is attached.

* cited by examiner

BATTERY PACK AND PORTABLE ELECTRONIC APPARATUS

RELATED APPLICATIONS

The present application is a National Phase of International Application Number PCT/JP2014/064192, filed May 28, 2014, and claims priority of Japanese Patent Application No. 2013-112397 filed on May 28, 2013.

TECHNICAL FIELD

The present invention relates to a battery pack having plural terminals and a portable electronic apparatus equipped with the battery pack.

BACKGROUND ART

A battery pack according to the background art includes a power-supply terminal, a ground terminal, and identification (ID) terminal. Meanwhile, a battery pack having a non-contact charging function additionally includes two communication terminals for communication with an electronic apparatus body. That is, the battery pack having a non-contact charging function includes five terminals.

CITATION LIST

Patent Literature

Patent Literature 1: Japanese Unexamined Patent Application Publication No. 2006-81094

SUMMARY OF THE INVENTION

As the number of terminals in a battery pack increases, manufacturing costs thereof also increases.

A circuit board included in an electronic apparatus includes a battery connector for connection to the terminals of the battery pack when the circuit board is mounted on the battery pack. The larger the number of terminals in the battery pack becomes, the larger the battery connector becomes.

When the area of the battery connector in the circuit board increases, there is a possibility that restriction in circuit design such as changing mounting positions of other components will occur.

There is also a possibility that the electronic apparatus will be restricted in structure due to an increase in size of the battery connector, under requests for a decrease in thickness and size.

The present invention provides a battery pack that can perform a non-contact charging function without increasing the number of terminals and a portable electronic apparatus on which the battery pack is mounted.

According to the present invention, a battery pack has a power-supply terminal, a ground terminal, and a communication terminal and includes: a secondary battery that is connected to the power-supply terminal and the ground terminal; a resistive element that is connected to the communication terminal and the ground terminal; a switch unit that is connected in parallel to the resistive element and that is connected to the communication terminal and the ground terminal; a controller that performs control of switching an ON state and an OFF state of a switch of the switch unit; and a non-contact charging unit that performs non-contact charging.

The battery pack may further include a non-contact charging unit that performs non-contact charging, the resistive element may be a temperature sensor, and the controller may switch the switch of the switch unit to the ON state when the non-contact charging is started by the non-contact charging unit.

In the above battery pack, a resistance value of a connection line connected to the switch may be set to be lower than a resistance value of the temperature sensor.

In the above battery pack, the switch unit may have a configuration in which plural connection lines are connected in parallel and respective connection lines are connected to switches, the plural connection lines may be set to different resistance values, the connection line connected to the temperature sensor may be connected to a switch, and the controller may switch the ON states and OFF states of the switches of the switch unit and the switch connected to the connection line of the temperature sensor.

In the above battery pack, the switch unit may be connected to the controller via a signal connection line, and the controller may transmit information based on a signal received via the signal connection line to an external device via the non-contact charging unit.

The battery pack may be mounted on a portable electronic apparatus.

According to the present invention, a portable electronic apparatus on which a battery pack having a power-supply terminal, a ground terminal, and a communication terminal is mounted, includes: a mounting section on which the battery pack is mounted; a first terminal that is connected to the communication terminal when the battery pack is mounted on the mounting section; a signal receiver that receives a signal supplied from the communication terminal connected to the first terminal; and an execution unit that detects a start of non-contact charging with an external device by a non-contact charging unit built in the battery pack based on the signal received by the signal receiver and that executes a non-contact charging mode, wherein the battery pack includes a secondary battery that is connected to the power-supply terminal and the ground terminal, a temperature sensor that is connected to the communication terminal and the ground terminal, a switch unit that is connected in parallel to the temperature sensor and that is connected to the communication terminal and the ground terminal, a controller that performs control of switching an ON state and an OFF state of a switch of the switch unit, and the non-contact charging unit that performs the non-contact charging, wherein the controller switches the switch of the switch unit to the ON state when the non-contact charging is started by the non-contact charging unit, and wherein a resistance value of a connection line connected to the switch is set to be lower than a resistance value of the temperature sensor.

According to the present invention, it is possible to perform a non-contact charging function without increasing the number of terminals.

DETAILED DESCRIPTION OF THE PRESENT INVENTION

Figure 1:
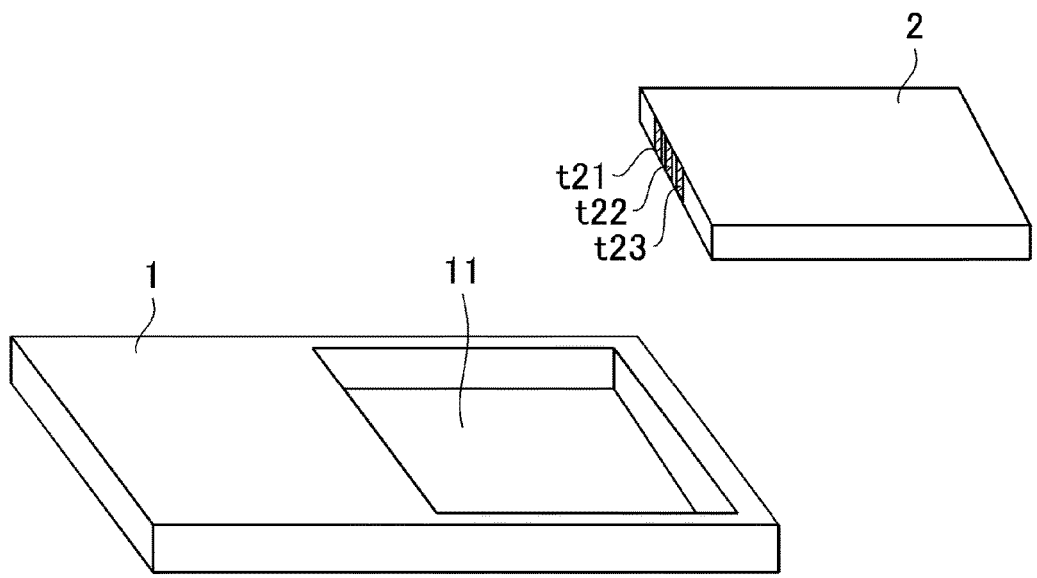
FIG. 1 is a diagram illustrating an appearance of a portable electronic apparatus and a battery pack.

In a portable electronic apparatus 1 according to the present invention, as illustrated in FIG. 1, a battery pack 2 including a power-supply terminal t21, a ground terminal t22, and a communication terminal t23 is mounted on a mounting section 11. Additionally, in practice, a battery cover not illustrated is mounted on the portable electronic apparatus 1 after the battery pack 2 is mounted on the mounting section 11. The power-supply terminal is referred to as a power-supply terminal or the like. The ground terminal is referred to as a GND terminal or the like. The communication terminal is referred to as an ID terminal, a battery ID terminal, or the like.

Figure 2:
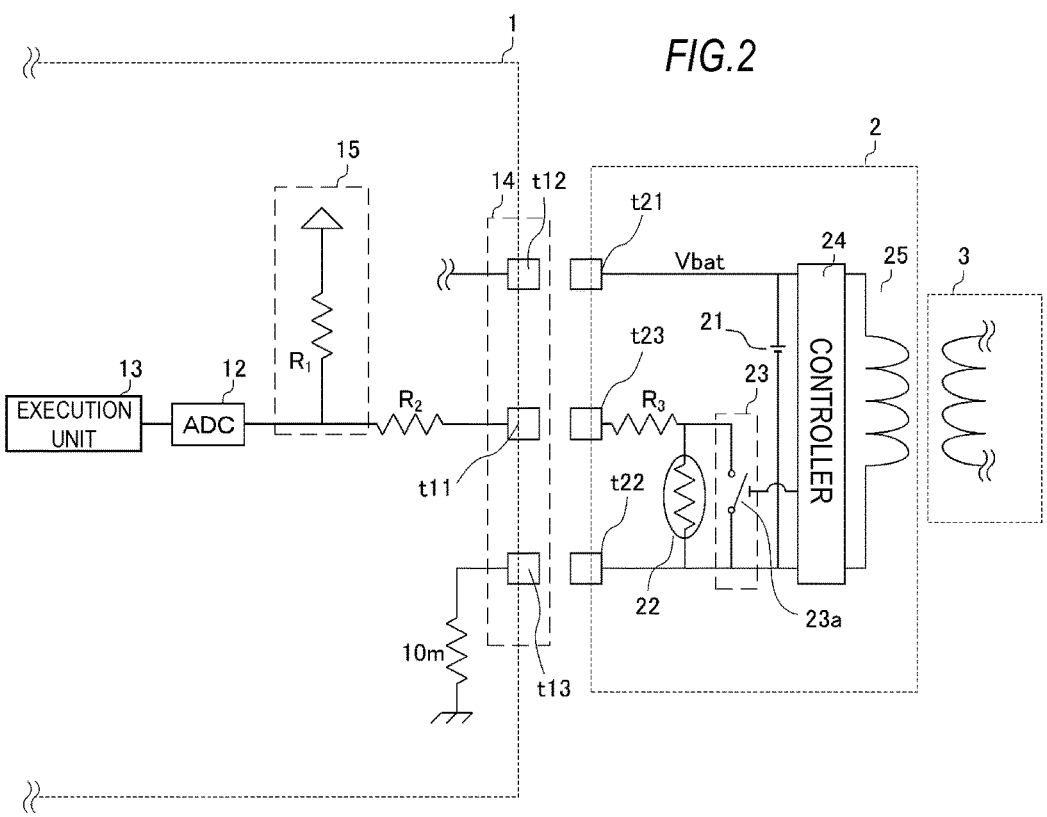
FIG. 2 is a diagram illustrating a configuration of the portable electronic apparatus and the battery pack.

As illustrated in FIG. 2, the battery pack 2 includes a secondary battery 21, a temperature sensor 22, a switch unit 23, a controller 24, and a non-contact charging unit 25.

The secondary battery 21 is connected to the power-supply terminal t21 and the ground terminal t22 and supplies a voltage Vbat to the terminals.

The temperature sensor 22 is connected to the communication terminal t23 and the ground terminal t22. The temperature sensor 22 is specifically constituted by a thermistor.

The switch unit 23 is connected in parallel to the temperature sensor 22 and is connected to the communication terminal t23 and the ground terminal t22.

The controller 24 performs control of switching an ON state and an OFF state of a switch 23a of the switch unit 23.

The non-contact charging unit 25 performs non-contact charging with an external device 3.

When the non-contact charging unit 25 starts the non-contact charging with the external device 3, the controller 24 switches the switch 23a of the switch unit 23 to the ON state.

The resistance value of a connection line connected to the switch unit 23 is set to be lower than the resistance value of the temperature sensor 22 and may be zero. This connection line refers to a conductor wire or an electrical wire and may not include a resistor such as R3 and the thermistor.

Accordingly, the resistance value from the controller 24 to the communication terminal t23 may be smaller when the switch 23a is turned on than when the switch 23a is turned off.

As illustrated in FIG. 2, the portable electronic apparatus 1 includes a signal receiver 12, an execution unit 13, and a contact unit 14.

The contact unit 14 includes a first terminal t11, a second terminal t12, and a third terminal t13. When the battery pack 2 is mounted on the mounting section 11, the first terminal t11 is connected to the communication terminal t23, the second terminal t12 is connected to the power-supply terminal t21, and the third terminal t13 is connected to the ground terminal t22.

The signal receiver (hereinafter, referred to as an analog-to-digital converter (ADC)) 12 detects a signal supplied from the communication terminal t23 connected to the first terminal t11. A pull-up resistor 15 for detecting that the battery pack 2 is not mounted on the mounting section 11 is connected between the first terminal t11 and the ADC 12.

The execution unit 13 can detect that the non-contact charging unit 25 built in the battery pack 2 starts the non-contact charging with the external device 3 based on the signal detected by the ADC 12. When the start of the non-contact charging is detected, the execution unit 13 may execute a non-contact charging mode.

The operations of the ADC 12 and the execution unit 13 will be described below.

Figure 3:
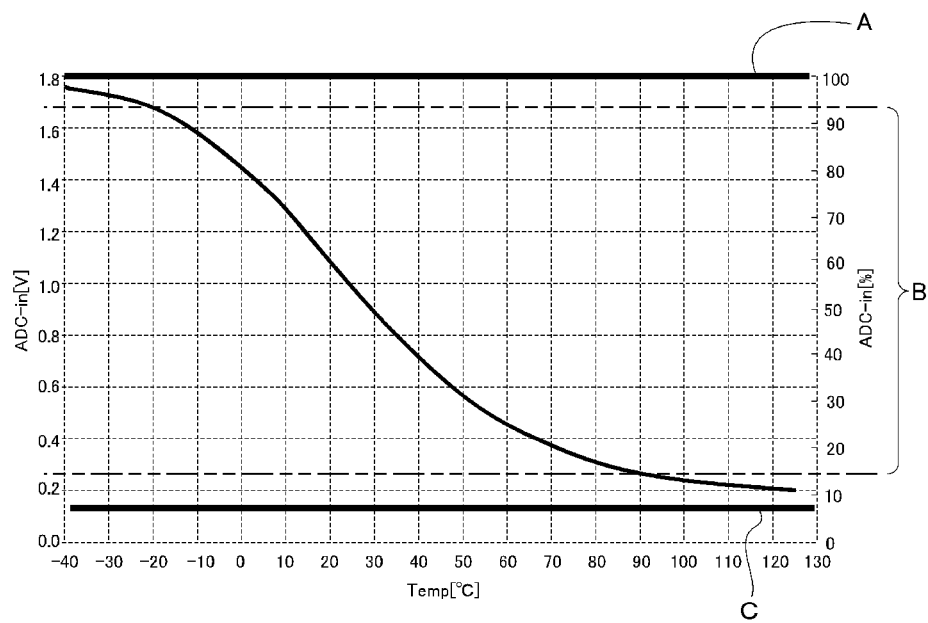
FIG. 3 is a diagram illustrating a relationship between a ratio and a voltage value of an ADC and a temperature of the battery pack.

The execution unit 13 calculates a ratio of the signal input to the ADC 12 or a voltage value corresponding to the ratio based on the signal detected by the ADC 12. The execution unit 13 calculates the temperature of the battery pack 2 based on the ratio or the voltage value. FIG. 3 illustrates a relationship between the ratio and the voltage value calculated based on the signal detected by the ADC 12 and the temperature of the battery pack 2.

Specifically, when the battery pack 2 is not mounted on the mounting section 11, the first terminal t11 is opened. The ADC 12 detects a voltage from a side of the pull-up resistor 15.

The execution unit 13 calculates the ratio (100%) or the voltage value (for example, 1.8 V) based on the signal detected by the ADC 12 (A in FIG. 3) and detects that the battery pack 2 is not mounted on the mounting section 11.

When the battery pack 2 is mounted on the mounting section 11 and the non-contact charging is not performed, the communication terminal t23 is connected to the first terminal t11 and the switch 23a of the switch unit 23 is kept turned off (opened) state. The ADC 12 detects the signal from the temperature sensor 22. The resistance value of the temperature sensor 22 varies with a variation in the temperature of the battery pack 2.

The execution unit 13 calculates the ratio (for example, about 15% to about 95%) or the voltage value (for example, about 0.25 V to about 1.70 V) based on the signal detected by the ADC 12 (B in FIG. 3) and calculates the temperature of the battery pack 2. In this embodiment, it is assumed that the temperature range of the battery pack 2 is from −20 degrees C. to 90 degrees C., but is not limited to this numerical range.

When the battery pack 2 is mounted on the mounting section 11 and the non-contact charging is started, the communication terminal t23 is connected to the first terminal t11 and the switch 23a of the switch unit 23 is switched to the ON (short) state.

The ADC 12 detects the signal from the switch unit 23. The ADC 12 may detect a signal due to the short state. Here, the short state refers to, for example, a state in which a current does not flow to the thermistor side having a high resistance value but a current flows to the switch 23a side having a low resistance value.

The execution unit 13 calculates the ratio (for example, about 8%) or the voltage value (for example, about 0.1 V) based on the signal detected by the ADC 12 (C in FIG. 3) and detects that the non-contact charging unit 25 starts the non-contact charging with the external device 3. When the start of the non-contact charging is detected, the execution unit 13 may execute a non-contact charging mode.

For example, in executing the non-contact charging mode, the execution unit 13 may check whether an application for the non-contact charging is installed, and may display a pop-up window on a display so as to download the application when the application is not installed.

The portable electronic apparatus 1 may download the application for the non-contact charging from a predetermined server in response to a predetermined operation by a user.

The execution unit 13 may be configured to notify that the non-contact charging is carried out (to turn on an LED or the like) in the executing the non-contact charging mode.

In this way, the battery pack 2 can perform the non-contact charging function without increasing the number of terminals.

Since the portable electronic apparatus 1 only has to include a battery connector corresponding to a three-terminal battery pack, the battery connector does not increase in size, and it is possible to freely select mounting positions of other components and to cope with requirements for a decrease in thickness and size.

That is, since the battery pack 2 includes the switch unit 23, it is possible to notify the portable electronic apparatus 1 of the start of the non-contact charging without increasing the number of terminals. The portable electronic apparatus 1 can detect the start of the non-contact charging without increasing the number of terminals by detecting a signal using the ADC 12.

The portable electronic apparatus 1 has a normal battery pack mounted thereon at the time of shipping from a factory and then the normal battery pack can be replaced with the battery pack 2 having the non-contact charging function.

In FIG. 2, a resistor $R_2$ (for example, 2.2 kΩ) is connected between the first terminal t11 and the pull-up resistor 15 of the portable electronic apparatus 1 and a resistor $R_3$ (for example, 8.2 kΩ) is connected to the communication terminal t23 of the battery pack 2, but the present invention is not limited to this configuration. For example, a resistor (the sum 10.4 kΩ of the resistor $R_2$ and the resistor $R_3$) may be connected only between the first terminal t11 and the pull-up resistor 15 of the portable electronic apparatus 1. The resistance values of the resistors may be arbitrarily set or the resistor $R_1$ of the pull-up resistor 15 may have an arbitrary value (for example, 100Ω).

Examples of the ratio or the voltage value based on the signal detected by the ADC 12 are described above, but these values vary depending on the resistance value of at least one of the resistors $R_1$, $R_2$, and $R_3$.

The controller 24 can transmit information to the portable electronic apparatus 1 based on a predetermined communication protocol by setting the ON state of the switch 23a of the switch unit 23 to "1", setting the OFF state thereof to "0", and appropriately switching the switch 23a. The controller 24 may appropriately switch the switch 23a based on information (for example, coupon information) transmitted from the external device 3 via the non-contact charging unit 25. According to this configuration, the portable electronic apparatus 1 can acquire the information transmitted from the external terminal 3 via the battery pack 2.

Although not illustrated, the first terminal t11 is connected to a detector (charging circuit) in parallel with the ADC 12. The detector is also connected to the second terminal t12.

A charger (not illustrated) connected to a commercial power supply is connected to the power-supply terminal t21 of the battery pack 2 via the detector and the second terminal t12.

When it is detected that the ratio (ADC-in) of the ADC 12 is set to a predetermined value (for example, 25%) and the value of the temperature sensor 22 supplied via the communication terminal t23 and the first terminal t11 is equal to or less than the predetermined value, the detector causes the battery pack 2 to stop the charging operation by turning off the connection between the charger and the second terminal t12.

The switch unit 23 may have a configuration in which plural connection lines are connected in parallel and a switch is connected to respective connection lines.

The plural connections lines are set to different resistance values.

The connection line connected to the temperature sensor 22 is connected to a switch.

The controller 24 switches the ON states and the OFF states of the switches of the switch unit 23 and the switch connected to the connection line of the temperature sensor 22.

Figure 4:
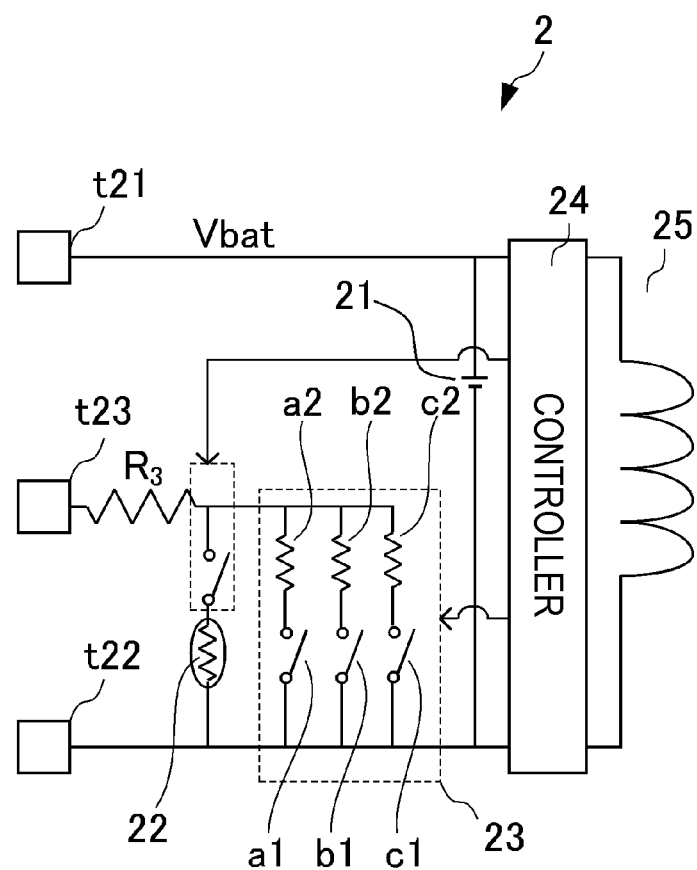
FIG. 4 is a diagram illustrating a configuration of a switch unit.

Specifically, as illustrated in FIG. 4, the switch unit 23 has a configuration in which a switch a1, a switch b1, and a switch c1 are connected in parallel and resistors (a2, b2, and c2) having different resistance values are connected in series to the switches, respectively.

The controller 24 can notify the portable electronic apparatus 1 of the variation from the temperature sensor 22 by switching the switch connected to the connection line of the temperature sensor 22 to the ON state and switching all the switch a1, the switch b1, and the switch c1 of the switch unit 23 to the OFF state.

The controller 24 can notify the portable electronic apparatus 1 of a signal due to the resistor a2 by switching the switch connected to the connection line of the temperature sensor 22 to the OFF state, switching the switch a1 of the switch unit 23 to the ON state, and switching the switch b1 and the switch c1 to the OFF state.

The controller 24 can notify the portable electronic apparatus 1 of a signal due to the resistor b2 by switching the switch connected to the connection line of the temperature sensor 22 to the OFF state, switching the switch b1 of the switch unit 23 to the ON state, and switching the switch a1 and the switch c1 to the OFF state.

The controller 24 can notify the portable electronic apparatus 1 of a signal due to the resistor c2 by switching the switch connected to the connection line of the temperature sensor 22 to the OFF state, switching the switch c1 of the switch unit 23 to the ON state, and switching the switch a1 and the switch b1 to the OFF state.

Accordingly, the portable electronic apparatus 1 can detect plural states of the battery pack 2. In this embodiment, the switch unit 23 has a configuration in which three pairs of switch and resistor are connected in series, but the present invention is not limited to this configuration and two or four or more pairs of switch and resistor may be provided. In the above-mentioned example, the configuration in which only one of the switch a1, the switch b1, and the switch c1 is switched to the ON state is described, but the present invention is not limited to this configuration and two or more switches may be switched to the ON state.

Figure 5:
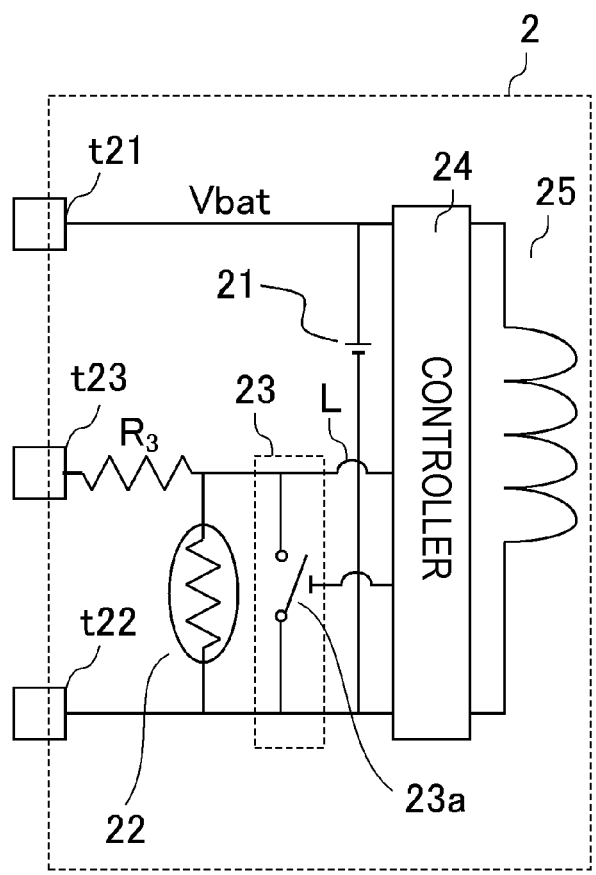
FIG. 5 is a diagram illustrating a configuration of a battery pack.

The switch unit 23 may be connected to the controller 24. Specifically, the switch unit 23 and the controller 24 are connected to each other via a signal connection line L as illustrated in FIG. 5.

The controller 24 transmits information based on a signal, which is transmitted from the portable electronic apparatus 1 via the switch unit 23, to the external device 3 via the non-contact charging unit 25.

The portable electronic apparatus 1 may command the battery pack 2 to stop the non-contact charging or the like. For example, the portable electronic apparatus 1 outputs a stop command S1 for the non-contact charging from the ADC 12 and supplies the stop command to the controller 24 via the first terminal t11, the communication terminal t23, and the signal connection line L. The controller 24 stops the charging operation by the non-contact charging unit 25 based on the stop command S1 supplied from the portable electronic apparatus 1.

According to this configuration, information may be transmitted between the portable electronic apparatus 1 and the battery pack 2 or between the portable electronic apparatus 1 and the external device 3 via the battery pack 2.

In this embodiment, the configurations and the operations of the battery pack 2 and the portable electronic apparatus 1 on which the battery pack 2 is mounted have been described, but the present invention is not limited to this example and may be embodied as a method and a program of detecting a start of non-contact charging, which include the constituent elements.

A program for realizing the functions of the battery pack 2 and the portable electronic apparatus 1 may be recorded on a computer-readable recording medium and the functions may be realized by causing a computer system to read and execute the program recorded on the recording medium.

Here, the "computer system" includes an operating system (OS) or hardware such as peripherals. Examples of the "computer-readable recording medium" include a portable medium such as a flexible disk, a magneto-optical disc, a read only memory (ROM), and a compact disk (CD)-ROM and a storage device such as a hard disk built in a computer system.

The "computer-readable recording medium" may include a medium that dynamically holds a program for a short time, like a communication line when a program is transmitted via a network such as the Internet or a communication circuit such as a telephone circuit and a medium that holds a program for a predetermined time, like a volatile memory in a computer system serving as a server or a client in this case. The program may be provided to realize a part of the above-mentioned functions. Alternatively, the above-mentioned functions may be realized in combination with a program recorded in advance in a computer system.

While the present invention has been described in detail with reference to specific embodiments, it is apparent to those skilled in the art that various modifications or corrections can be added thereto.

This application is based on Japanese Patent Application No. 2013-112397, filed on May 28, 2013, the content of which is incorporated herein by reference in its entirety.

REFERENCE SIGNS LIST 1 portable electronic apparatus
2 battery pack
11 mounting section
12 signal receiver (ADC)
13 execution unit
14 contact unit
15 pull-up resistor
21 secondary battery
22 temperature sensor
23 switch unit
24 controller
25 non-contact charging unit
t11 first terminal
t12 second terminal
t13 third terminal
t21 power-supply terminal
t22 ground terminal
t23 communication terminal

The invention claimed is:

1. A battery pack, comprising:
a power-supply terminal;
a ground terminal;
a communication terminal;
a secondary battery that is connected to the power-supply terminal and the ground terminal;
a resistive element that is connected to the communication terminal and the ground terminal;
a switch unit that is connected in parallel to the resistive element and that is connected to the communication terminal and the ground terminal; and
a controller that is configured to perform control of switching an ON state and an OFF state of a switch of the switch unit,
wherein the switch is closed in the ON state, and the switch is opened in the OFF state.

2. The battery pack according to claim 1, further comprising:
a non-contact charging unit that is configured to perform non-contact charging,
wherein the resistive element is a temperature sensor, and
wherein the controller is configured to switch the switch of the switch unit to the ON state when the non-contact charging is started by the non-contact charging unit.

3. The battery pack according to claim 1,
wherein a resistance value of a connection line connected to the switch is lower than a resistance value of the temperature sensor.

4. The battery pack according to claim 1,
wherein the switch unit has a configuration in which a plurality of connection lines are connected in parallel and respective connection lines are connected to switches,
wherein the plurality of connection lines have different resistance values,
wherein the connection line connected to the temperature sensor is connected to a switch, and
wherein the controller is configured to switch the ON states and OFF states of the respective switches of the switch unit and the switch connected to the connection line of the temperature sensor.

5. The battery pack according to claim 1,
wherein the switch unit is connected to the controller via a signal connection line, and
wherein the controller is configured to transmit information based on a signal received via the signal connection line to an external device via the non-contact charging unit.

6. A portable electronic apparatus, comprising the battery pack according to claim 1,
wherein the battery pack is mounted on the portable electronic apparatus and configured to supply power to the portable electronic apparatus.

7. The battery pack according to claim 1, further comprising:
a non-contact charging unit coupled to the controller and configured to perform non-contact charging,
wherein the controller is configured to switch the switch of the switch unit to the ON state in response to a signal from the non-contact charging unit indicating a start of non-contact charging by the non-contact charging unit.

8. A portable electronic apparatus, comprising:
a battery pack having
a power-supply terminal;
a ground terminal; and
a communication terminal;
a mounting section on which the battery pack is mounted;
a first terminal that is connected to the communication terminal when the battery pack is mounted on the mounting section;
a signal receiver that is configured to receive a signal supplied from the communication terminal connected to the first terminal; and an execution unit that is configured to
  detect a start of non-contact charging with an external device by a non-contact charging unit built in the battery pack based on the signal received by the signal receiver, and
  execute a non-contact charging mode,
wherein the battery pack further includes:
  a secondary battery that is connected to the power-supply terminal and the ground terminal;
  a temperature sensor that is connected to the communication terminal and the ground terminal;
  a switch unit that is connected in parallel to the temperature sensor and that is connected to the communication terminal and the ground terminal;
  a controller that is configured to perform control of switching an ON state and an OFF state of a switch of the switch unit, wherein the switch is closed in the ON state, and the switch is opened in the OFF state; and
  the non-contact charging unit that is configured to perform the non-contact charging,
wherein the controller is configured to switch the switch of the switch unit to the ON state when the non-contact charging is started by the non-contact charging unit, and
wherein a resistance value of a connection line connected to the switch is lower than a resistance value of the temperature sensor.

* * * * *